United States Patent
Ali

(10) Patent No.: US 7,962,724 B1
(45) Date of Patent: Jun. 14, 2011

(54) BRANCH LOOP PERFORMANCE ENHANCEMENT

(75) Inventor: Abid Ali, Santa Clara, CA (US)

(73) Assignee: Oracle America, Inc., Redwood City, CA (US)

( * ) Notice: Subject to any disclaimer, the term of this patent is extended or adjusted under 35 U.S.C. 154(b) by 404 days.

(21) Appl. No.: 11/864,579

(22) Filed: Sep. 28, 2007

(51) Int. Cl.
G06F 9/30 (2006.01)

(52) U.S. Cl. ......................................................... 712/207

(58) Field of Classification Search .................. None
See application file for complete search history.

(56) References Cited

U.S. PATENT DOCUMENTS

| | | | | | |
|---|---|---|---|---|---|
| 5,933,627 | A | * | 8/1999 | Parady | 712/228 |
| 6,564,313 | B1 | * | 5/2003 | Kashyap | 712/207 |
| 6,775,765 | B1 | * | 8/2004 | Lee et al. | 712/241 |
| 2003/0204705 | A1 | * | 10/2003 | Oldfield et al. | 712/207 |
| 2005/0125791 | A1 | | 6/2005 | Welbon et al. | |
| 2006/0190710 | A1 | * | 8/2006 | Rychlik | 712/240 |
| 2006/0242365 | A1 | * | 10/2006 | Ali et al. | 711/137 |
| 2008/0005542 | A1 | * | 1/2008 | Gschwind | 712/239 |
| 2009/0055589 | A1 | * | 2/2009 | Croxford et al. | 711/119 |

OTHER PUBLICATIONS

U.S. Appl. No. 11/673,905, filed Feb. 12, 2007.
U.S. Appl. No. 12/113,706, filed May 1, 2008.
U.S. Appl. No. 12/113,716, filed May 1, 2008.

* cited by examiner

*Primary Examiner* — Robert Fennema
(74) *Attorney, Agent, or Firm* — Rory D. Rankin; Meyertons, Hood, Kivlin, Kowert & Goetzel, P.C.

(57) ABSTRACT

A system and method for management of resource allocation for speculative fetched instructions following small backward branch instructions. An instruction fetch unit speculatively prefetches a memory line for each fetched memory line. Each memory line may have a small backward branch instruction, which is a backward branch instruction that has a target instruction within the same memory line. For each fetched memory line, the instruction fetch unit determines if a small backward branch instruction exists among the instructions within the memory line. If a small backward branch instruction is found and predicted taken, then the instruction fetch unit inhibits the speculative prefetch for that particular thread. The speculative prefetch may resume for that thread after the branch loop is completed. System resources may be better allocated during the iterations of the small backward branch loop.

17 Claims, 4 Drawing Sheets

BRANCH LOOP PERFORMANCE ENHANCEMENT

BACKGROUND OF THE INVENTION

1. Field of the Invention

This invention relates to microprocessors, and more particularly, to the management of resource allocation for speculative fetched instructions following small backward branch instructions.

2. Description of the Relevant Art

Modern processor cores, or processors, are pipelined in order to increase throughput of instructions per clock cycle. However, the throughput may still be reduced due to certain events. One event is a stall, which may be caused by a branch misprediction, a cache miss, data dependency, or other, wherein no useful work may be performed for a particular instruction during a clock cycle. Another event may be that resources, such as circuitry for an arithmetic logic unit (ALU) or for a load-store unit (LSU), may not be used for one or more clock cycles due to the type of instruction being executed in a particular clock cycle.

Different techniques are used to fill these unproductive cycles in a pipeline with useful work. Some examples include loop unrolling of instructions by a compiler, branch prediction mechanisms within a core and out-of-order execution within a core. An operating system may divide a software application into processes and further divide processes into threads. A thread is a sequence of instructions that may share memory and other resources with other threads and may execute in parallel with other threads. A processor core may be constructed to execute more than one thread per clock cycle in order to increase efficient use of the hardware resources and reduce the effect of stalls on overall throughput. A microprocessor may include multiple processor cores to further increase parallel execution of multiple instructions per clock cycle.

Further, due to spatial and temporal locality of memory line accesses of a cache, each processor core may prefetch one or more memory lines of an instruction cache (i-cache) during a fetch of a requested memory line. If the prefetch line hits in the first-level, or L1, I-cache, then during a subsequent access, the memory line may already be located in a fetch buffer within the processor or may shortly arrive to the processor due to the earlier speculative prefetch. Therefore, the latency to access the instructions from the memory hierarchy may be greatly reduced. Also, if the prefetch line misses in the L1 I-cache, the access of the L2 I-cache, and possibly lower levels of memory if needed, may begin earlier. Again, the latency to access instructions may be reduced.

A problem arises with the speculative prefetch of an i-cache memory line when the previous accessed memory line includes a small backward taken branch instruction. For example, a memory line may include multiple instructions. One of these instructions may be a backward taken branch instruction. Another instruction in the same memory line may be the target instruction for the branch instruction. Therefore, the address of the branch target memory line is the same address as this memory line that was already fetched. Until the branch condition is not satisfied and instruction flow breaks out of the loop, the speculative fetched memory line is not needed. However, during each iteration of the loop, this speculative memory line is fetched and consumes hardware resources within the processor. No useful work will be performed for the instructions within this memory line during the loop iterations. However, resources, such as registers, buffer entries, ports, buses, and other, are unnecessarily used by these instructions and may greatly add to the latency of other instructions not able to utilize the resources.

In view of the above, an efficient method for the management of resource allocation for speculative fetched instructions following small backward branch instructions is desired.

SUMMARY OF THE INVENTION

Systems and methods for management of resource allocation for speculative fetched instructions following small backward branch instructions. In one embodiment, a system includes a memory that stores instructions of an application. Each instruction in the memory may be assigned to a thread. An instruction fetch unit may fetch multiple instructions per clock cycle from the memory. The instruction fetch unit may speculatively prefetch a second memory line corresponding to each fetched memory line. Each memory line may have a small backward branch instruction, which is a backward branch instruction that has a target instruction within the same memory line. For each fetched memory line, the instruction fetch unit may determine if a small backward branch instruction exists among the instructions within the memory line. If a small backward branch instruction is found and predicted taken, then the instruction fetch unit inhibits the speculative prefetch for that particular thread. The speculative prefetch may resume for that thread after the branch loop is completed.

Figure 1:
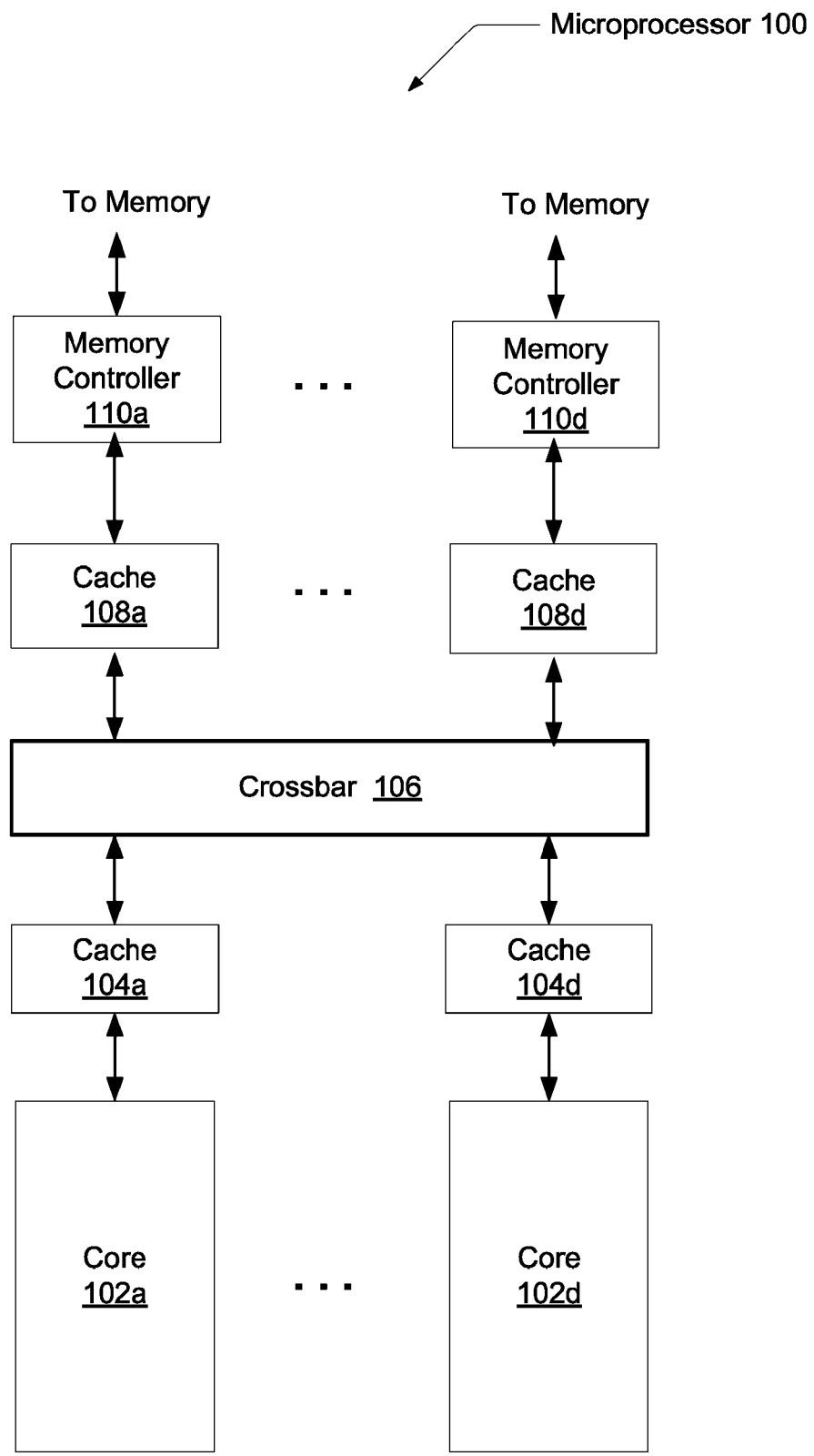
FIG. 1 is a generalized block diagram illustrating one embodiment of a microprocessor.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

Referring to FIG. 1, one embodiment of a microprocessor 100 is shown. Microprocessor 100 may have multiple cores 102*a*-102*d*. As used herein, elements referred to by a reference numeral followed by a letter may be collectively referred to by the numeral alone. For example, cores 102*a*-102*d* may be collectively referred to as cores 102. Each core 102 may include a superscalar microarchitecture with one or more multi-stage pipelines. Also, each core 102 may be designed to execute multiple strands. Each core 102 may comprise a first-level cache or in other embodiments, the first-level cache 104 may be outside the core 102.

A crossbar 106 may be used to connect each core 102 and first-level cache 104 to shared resources such as second-level caches 108 and lower-level memory via memory controllers 110. Interfaces between crossbar 106 and the different levels of caches 104 and 108 may comprise any suitable technology. In other embodiments, other levels of caches may be present between cache 108 and memory controller 110. Also, an I/O bus adapter, not shown, may be coupled to crossbar 106 to provide an interface for I/O devices to caches 104 and 108 and cores 102. In another embodiment, an I/O interface may be implemented in memory controller 110. Memory controllers 110 may be coupled to lower-level memory, which may include other levels of cache on the die outside the microprocessor, dynamic random access memory (DRAM), dual in-line memory modules (dimms) in order to bank the DRAM, a hard disk, or a combination of these alternatives. Also, in other embodiments, there may only be a single memory controller 110 on microprocessor 100.

Figure 2:
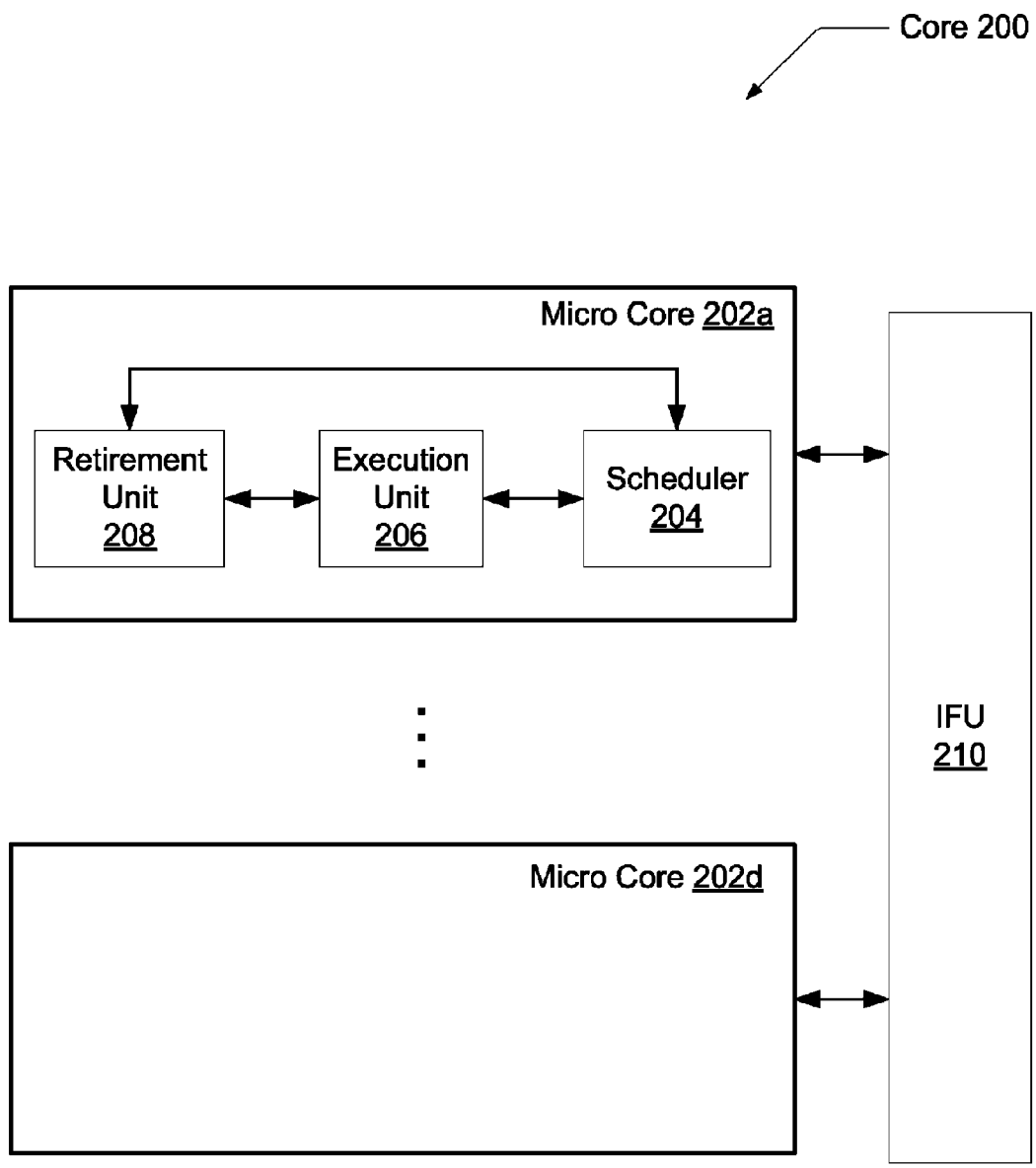
FIG. 2 is a generalized block diagram illustrating one embodiment of a processor core.

FIG. 2 illustrates one embodiment of a processor core 200 within a microprocessor 100. Each core 200 may comprise multiple micro cores 202. Each micro core 202 may include a superscalar microarchitecture with a multi-stage pipeline as well as perform out-of-order execution of the instructions. Also, each micro core 202 may be configured to execute instructions for 2 strands simultaneously. In other embodiments, each micro core 202 may be able to execute one, four, or another number of strands simultaneously.

In one embodiment, an instruction fetch unit (IFU) 210 fetches instructions from memory, which may include a first-level instruction-cache (i-cache) and a corresponding instruction translation-lookaside-buffer (i-TLB). The i-cache and i-TLB may be placed within processor core 200. In other embodiments, they may be placed outside the core 200. The instruction i-cache and i-TLB may store instructions and addresses respectively in order to access the instructions for a software application. In one embodiment, the IFU 210 may fetch multiple instructions from the i-cache per clock cycle if there are no i-cache or i-TLB misses.

The IFU 210 may include a program counter that holds a pointer to an address of a memory line containing the next instruction(s) to fetch from the i-cache. This address may be compared to addresses in the i-TLB. In one embodiment, an address of a speculative fetch may be derived from the address in the program counter. The address of the speculative fetch may be sent to the i-TLB in the same clock cycle as the program counter value or a subsequent clock cycle. The embodiment used may depend on the number of ports in both the i-cache and the i-TLB. In one embodiment, the address of the speculative fetch may be the address of the next line in memory from the memory line corresponding the program counter value.

The IFU 210 may also include a branch prediction unit to predict an outcome of a conditional instruction prior to an execution unit determining the actual outcome in a later pipeline stage. Logic to calculate a branch target address may also be included in IFU 210. The IFU 210 may need to fetch instructions for multiple strands. For example, there may be 4 micro cores 202 and each micro core 202 may be capable of executing 2 strands simultaneously. Therefore, the IFU 210 may need to monitor the instruction fetch requirements of 8 different strands.

Each micro core 202 may comprise a pipeline that includes a scheduler 204, an execution unit 206, and a retirement unit 208. For purposes of discussion, the functionality and placement of blocks in this embodiment are shown in a certain manner. However, some functionality or logic may occur in a different block than shown. Additionally, some blocks may be combined or further divided in another embodiment. For example, a decoder unit may be included in the IFU 210 or in the scheduler 204. The decoder unit decodes the opcodes of the one or more fetched instructions per clock cycle. In one embodiment, the instructions may be pre-decoded prior to arriving to the decoder 204. The instructions may be stored in the i-cache in the pre-decoded format or the instructions may be pre-decoded in the IFU 210.

After decoding, both data and control signals for the instruction may be sent to a buffer within the scheduler 204 of the appropriate strand. Scheduler 204 may allocate multiple entries per clock cycle in a reorder buffer included in the retirement unit 208. In another embodiment, the decoder unit may perform this allocation. The reorder buffer may be configured to ensure in-program-order retirement of instructions. The scheduler 204 may include circuitry referred to as reservation stations where instructions are stored for later issue and register renaming may occur. The allocation of entries in the reservation stations is considered dispatch. Scheduler 204 may retrieve source operands of an instruction from a register file or a reorder buffer included in the retirement unit 208. Also, the source operands may be retrieved from the result buffers or buses within the execution unit 206. The scheduler 204 may issue instructions to the execution unit 206 when the source operands of the instruction are ready and an available function unit is ready within the execution unit 206 to operate on the instruction. The scheduler 204 may issue multiple instructions per clock cycle and may issue the instructions out-of-program-order.

These instructions may be issued to integer and floating-point arithmetic functional units, a load/store unit, or other within the execution unit 206. The functional units may include arithmetic logic units (ALU's) for computational calculations such as addition, subtraction, multiplication, division, and square root. Logic may be included to determine an outcome of a flow control conditional instruction. The load/store unit may include queues and logic to execute a memory access instruction.

Results from the functional units and the load/store unit within the execution unit 206 may be presented on a common data bus in order to retire instructions and to bypass data to dependent instructions. The results may be sent to the reorder buffer in the retirement unit 208. In one embodiment, the reorder buffer may be implemented as a first-in first-out (FIFO) queue that ensures in-order retirement of instructions according to program order. Here, an instruction that receives its results is marked for retirement. If the instruction is head-of-the-queue, it may have its results sent to a register file within the retirement unit 208. The register file may hold the architectural state of the general-purpose registers (GPRs) of the micro core 202.

Figure 3:
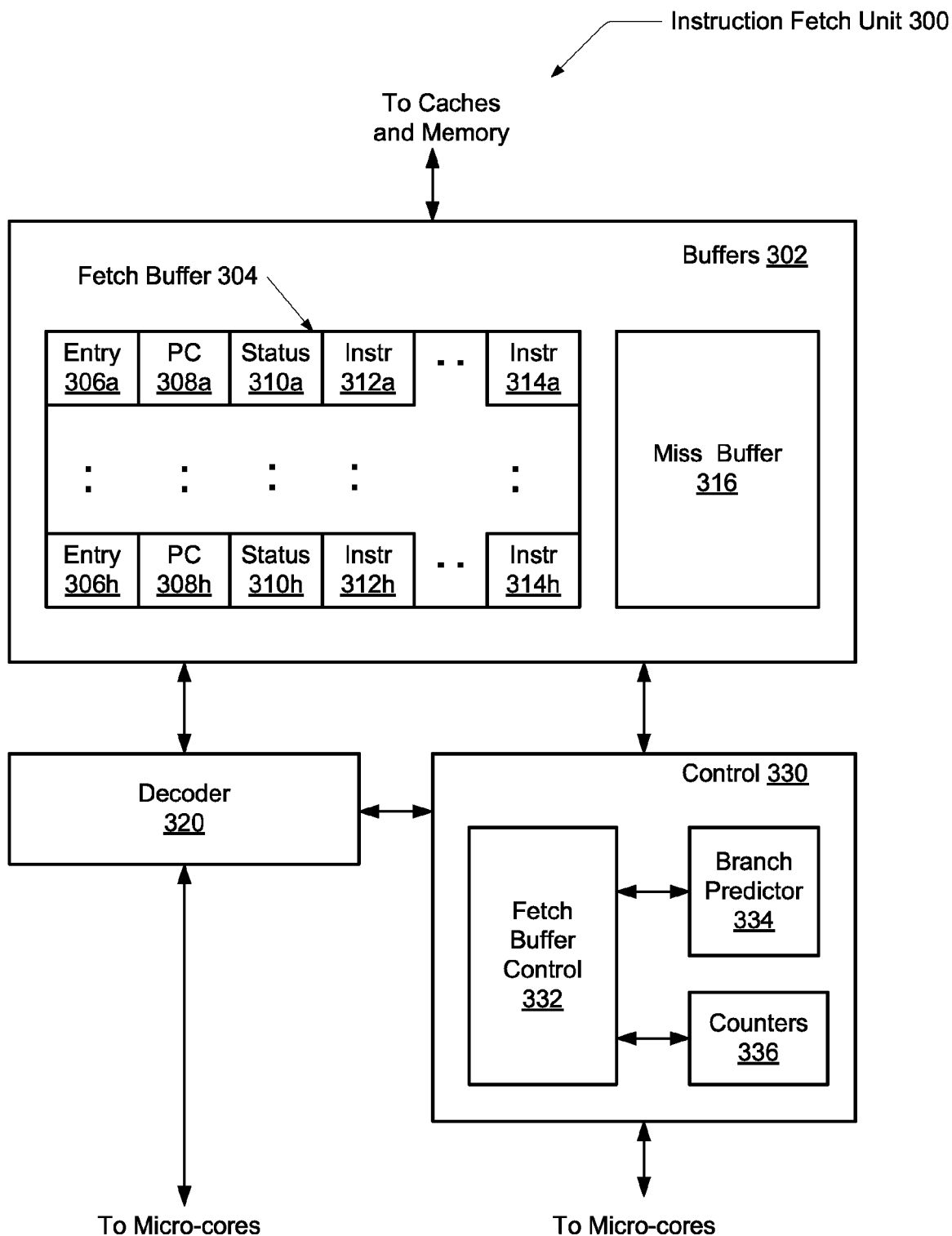
FIG. 3 is a generalized block diagram illustrating another embodiment of an instruction fetch unit.

Referring now to FIG. 3, one embodiment of an instruction fetch unit (IFU) 300 is shown. A set of buffers 302 may be included in the IFU 300. The set 302 may include a Fetch Buffer 304 and a Miss Buffer 316. The Fetch Buffer 304 may be used to store memory data of a memory line when it arrives from memory or from the instruction cache. The memory access requests may arrive from a micro core and also may be derived within the IFU 300 as a speculative request dependent on the micro core requests. In alternative embodiments, the Fetch Buffer 304 may be divided into several buffers in order to allow each strand of a particular micro core or each micro core to have its own buffer. Also, circuitry limitations may determine the division of the buffer and the specific chosen implementation of Fetch Buffer 304.

In one embodiment, each entry of the Fetch Buffer 304 may have an entry number 306, and the address of the memory request, or the program counter 308. Status information 310 may include a valid bit, the strand number, a bit to signify the request is still waiting on hit or miss information, and other status information. One or more instructions, 312 and 314, returned from a memory on a cache hit may be included. In one embodiment, a memory line may comprise 64 bytes containing 16 instructions.

The Miss Buffer 316 may be used to store memory requests that missed the first-level cache. In one embodiment, the Miss Buffer 316 may be a separate buffer from the Fetch Buffer 304 due to circuit constraints or different functional needs. Miss Buffer may enqueue miss requests that are generated on a per strand basis either from instruction accesses or the translation look-aside buffer. Once data is returned from lower level caches or a memory management unit, Miss Buffer control logic may generate control signals to route the incoming data to the instruction cache or translation buffer. Data destined for the instruction cache may also be forwarded to the Fetch Buffer 304.

As mentioned above, a decoder 320 may be included in the IFU 300 or in the scheduler 204 of a micro core. The decoder 320 decodes the opcodes of the one or more fetched instructions per clock cycle. In one embodiment, the instructions may be pre-decoded prior to arriving to the decoder 320. A control block 330 in the IFU 300 may include a branch predictor 334 to predict an outcome of a conditional instruction prior to an execution unit determining the actual outcome in a later pipeline stage. Logic to calculate a branch target address may also be included.

In one embodiment, a fetch buffer control 332 may be used to monitor the memory access requests on a per strand basis. The combinatorial logic within the fetch buffer control 332 may use the values in the counters 336 to monitor and maintain the number of allowable memory requests, or credits, each strand possesses at a given time. For example, each strand may have 2 credits each. Each strand may have a counter within the counters 336. This corresponding counter may decrement when a memory request for the strand is sent from the Fetch Buffer 304 to the first-level cache. In one embodiment, the counter may increment when the memory line is returned from the first-level cache to the Fetch Buffer 304 or Miss Buffer 316. In alternative embodiments, the counter may increment when instructions from the returned memory line are decoded, sent to the scheduler, or satisfy another requirement. The above discussion uses a zero value for the counter to denote a strand has used all of its credits and may not make a memory access request. An alternative embodiment may include the counters count up to a maximum value to denote all the credits are used, rather than count down to zero.

When multiple strands simultaneously have memory access requests and sufficient credits to make a request, the fetch buffer control 332 decides which requests occur first. In one embodiment, a round-robin scheme may be used. In alternative embodiments, the least-requesting strand or the most-requesting strand may be chosen, or another priority scheme may be used.

In one embodiment, the first-level cache may be single-ported. In this case, only one memory access request per clock cycle may be sent from the Fetch Buffer 304 to the first-level cache. In one embodiment, for every memory access request sent to the first-level cache, a subsequent speculative request may be sent in the following clock cycle. This speculative fetch may request the next memory line following the previously requested memory line.

As used herein, the notation 0x indicates the subsequent number is in hexadecimal format. For example, if strand 3 has an i-cache memory access request for address 0x0032C000, strand 3 has sufficient credits, and the fetch buffer control 332 determines strand 3 has priority over other strands at this time, then the program counter (PC) may store the address. Then the next access to the single-ported i-cache may be for the memory line at address 0x0032C000. If the i-cache has 64-byte memory lines, then in the subsequent clock cycle, a speculative fetch for address 0x0032C040 may occur. Due to spatial and temporal localities of memory lines in caches, there is a high probability that strand 3 will later request the memory line at 0x0032C040. The speculative fetch may greatly reduce the latency for this subsequent memory line.

A memory line that arrives from the i-cache or other memory may be placed in the Fetch Buffer 304 or the Miss Buffer 316 depending on whether or not the memory access request hit in the first-level cache. When the instructions of the memory line are placed in the Buffers 302, the fetch buffer control 332 may include logic to detect any small backward branch instructions in the memory line. In one embodiment, detection may include partial decoding the opcode field of an instruction in order to determine if the instruction is a backward branch instruction. Full decoding of the opcode field is not needed at this time. Also, an address displacement field of the instruction may be decoded and determined if the displacement falls within the memory line itself. If the instruction is found to be a backward branch instruction with a target address within the memory line, then a small backward branch instruction has been found. Other methods may be used to determine the presence of a small backward branch instruction within the memory line.

If any small backward branch instructions are detected, a state bit within the fetch buffer control 332 for this particular strand may be set. If the state bit is already set, then logic within the fetch buffer control 332 may inhibit the speculative fetch for this strand. In alternative embodiments, after the small backward branch instruction is detected, a predicted decision may be found. Then the state bit would not be needed. However, this embodiment may be only used if sufficient time exists in the clock cycle to make the prediction.

If the small backward branch instruction is found to be taken, whether it is found by using the state bit or by making a prediction, then the memory line retrieved from the speculative fetch is not needed during the duration of the branch instruction loop iterations. By inhibiting the speculative fetch, resources such as the Fetch Buffer 304, Miss Buffer 316, and interfaces to other memory are not used by an unneeded memory line. Table 1 shows an example of a timing flow of a memory access request with a small backward branch instruction followed by a speculative prefetch. Events are shown both with and without inhibition of the speculative prefetch. For simplicity, it is assumed the same strand is chosen during the duration of the branch loop. The address for the speculative prefetch is shown as Addr X+1 to denote the next memory line in the first-level cache regardless of the size of the memory lines.

TABLE 1

Timing Flow of Small Backward Loop

| Clock Cycle | Event without Speculative Inhibition | Event with Speculative Inhibition | Comment |
| --- | --- | --- | --- |
| 1 | Send Addr X to L1 cache. | Same. | Loop iteration 1. |
| 2 | Speculatively send Addr X + 1 to L1 cache. | Same. | |
| 3 | Small bkwd branch is in returned Mem Line (Addr X). | Detect small bkwd branch. Set small bkwd branch state bit. | |

TABLE 1-continued

Timing Flow of Small Backward Loop

| Clock Cycle | Event without Speculative Inhibition | Event with Speculative Inhibition | Comment |
|---|---|---|---|
| 4 | Make prediction for small bkwd branch. | Same. | |
| 5 | Send Addr X to L1 cache. | Same. | Loop iteration 2. |
| 6 | Speculatively send Addr X + 1 to L1 cache. | Same. | |
| 7 | Small bkwd branch is in returned Mem Line (Addr X). | Detect small bkwd branch. Trigger Inhibit signal. | |
| 8 | Make prediction for small bkwd branch. | Same. | |
| 9 | Send Addr X to L1 cache. | Same. | Loop iteration 3. |
| 10 | Speculatively send Addr X + 1 to L1. | No speculative prefetch (inhibited). | Without invention, speculative memory line occupies buffer entries and memory is accessed. |
| 11 | Small bkwd branch is in returned Mem Line (Addr X). | Detect small bkwd branch. Trigger Inhibit signal. | |
| 12 | Make prediction for small bkwd branch. | Same. | |
| 401 | Send Addr X to L1 cache. | Same. | Loop iteration 101. |
| 402 | Speculatively send Addr X + 1 to L1. | No speculative prefetch (inhibited). | Without invention, speculative memory line occupies buffer entries and memory is accessed. |
| 403 | Small bkwd branch is in returned Mem Line (Addr X). | Detect small bkwd branch. Trigger Inhibit signal. | |
| 404 | Last taken prediction is found to be wrong. | Same. Also reset both small branch state bit and Inhibit signal. | |
| 405 | Send Addr Y to L1 cache. | Same. | Out of Loop. |
| 406 | Speculatively send Addr Y + 1 to L1. | Same. | |

Figure 4:
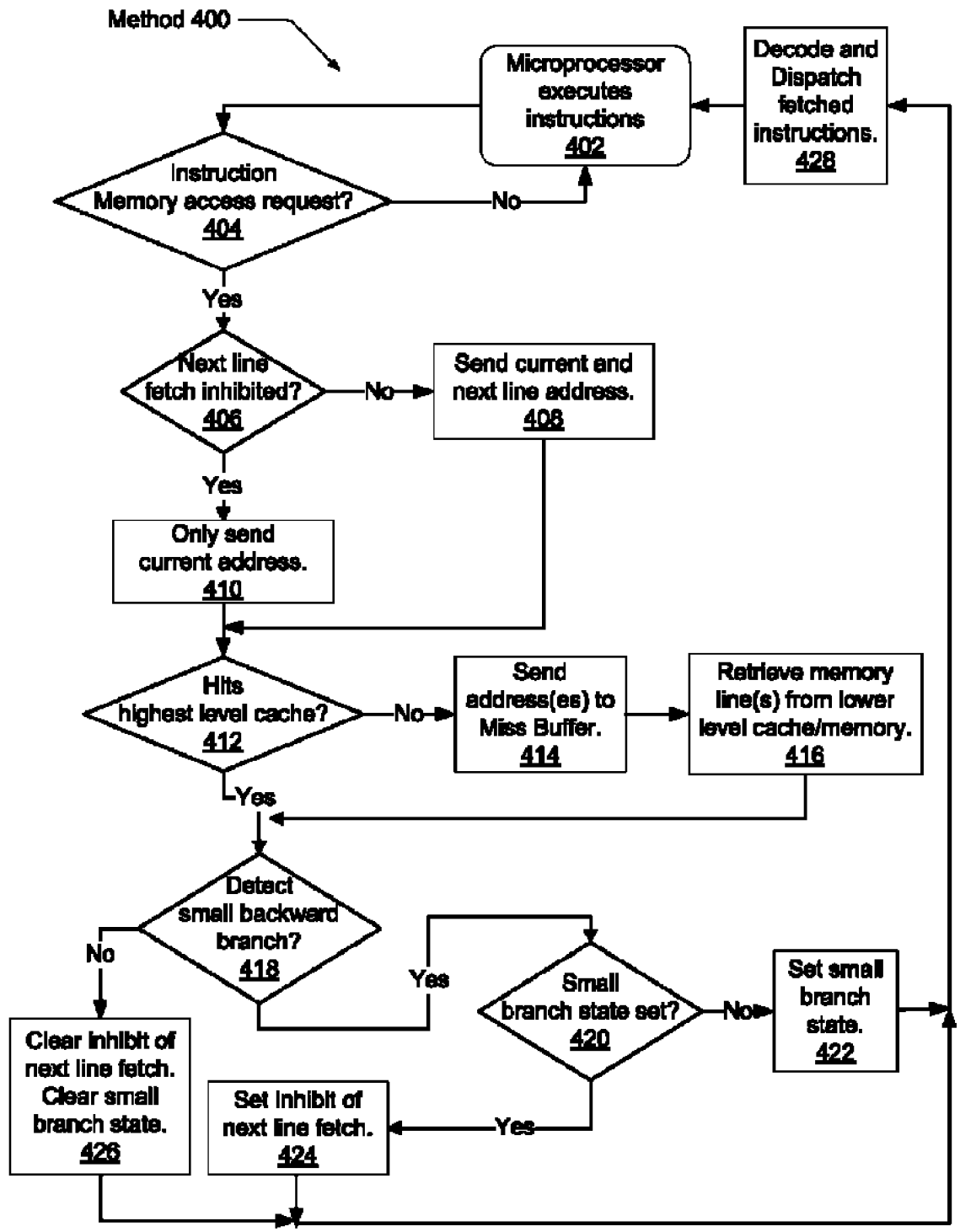
FIG. 4 is a flow diagram of one embodiment of a method for management of resource allocation for speculative fetched instructions following small backward branch instructions.

Turning now to FIG. 4, one embodiment of a method 400 for management of resource allocation for speculative fetched instructions following small backward branch instructions is shown. A microprocessor is executing instructions in block 402. The microprocessor may have multiple cores and micro cores to execute the instructions of multiple strands. One of these strands may have both priority over other strands and a memory access request in block 404. If the next line, which may be a speculative prefetch, is not inhibited (decision block 406), then the addresses of both the memory access request and the next line in memory may be sent to memory in block 408. In one embodiment, the next line address may be sent in a subsequent clock cycle if the memory is single-ported. The memory may be a first-level cache.

If the next line is inhibited (decision block 406), then the address of the memory access request may be the only address sent to memory at this time in block 410. The speculative prefetch may be inhibited. If the memory accesses do not hit in the first-level cache (decision block 412), then the address(es) of the request(s) may be sent to a Miss Buffer in block 414. The Miss Buffer may queue first-level cache misses and later send the requests to lower-level caches or system memory. The Miss Buffer may have an interface with memory controllers, a crossbar, a network, or other, in order to send requests to the different levels of memory.

When the missed memory line is retrieved from a lower-level cache or memory in block 416 or if the memory access request(s) hit in the highest-level cache (decision block 412), then different fields of the memory line may be input into combinatorial logic prior to actual decoding of the instructions within the memory line. The logic may be used to detect whether or not the memory line includes a small backward branch instruction. There may not be enough time to predict whether or not this branch instruction is taken. The clock cycle may need to increase or one or more clock cycles may be needed to make a prediction. The throughput of the microprocessor may decrease and the benefit of detecting the branch instruction may be lost.

If the prediction of any detected small backward branch instruction is not determined by logic, then a state bit may be used instead. If a small backward branch instruction is not detected in the memory line (decision block 418), then the inhibition of a speculative prefetch is cleared and the state bit is cleared in block 426. If a small backward branch instruction is detected (decision block 418), and a state bit is not set (decision block 420), then this is the start of a potential loop in the program flow. The state bit is set in block 422 and no inhibition of a speculative prefetch of the next memory line is performed. The fetched instructions in the memory access request and in the speculatively prefetched next line are decoded and dispatched in the microprocessor in block 428.

If the state bit is set (decision block 420), then this is the second time the small backward branch instruction for this strand has been detected. The branch instruction is taken, since it is detected a second successive time in the same fetched memory line. The inhibition of the speculative prefetch is set in block 424. Since the small backward branch instruction is taken, the next memory line will not be used and may unnecessarily consume resources both in the microprocessor and outside the microprocessor such as a network, buses to lower-level memory, and other. The set inhibition will prevent the speculative prefetch from occurring and may improve resource allocation.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system comprising:
   a memory configured to store instructions corresponding to one or more threads of a computer program; and
   an instruction fetch unit coupled to the memory, wherein the instruction fetch unit is configured to:
   store a small branch state bit, wherein a value of the bit indicates whether an immediately prior fetched memory line included a small backward branch instruction, wherein a small backward branch instruction is a given branch instruction with a target that is in a same memory line as the given branch instruction and is younger in program order than the given branch instruction;
   maintain a prefetch inhibit signal, wherein when set the prefetch inhibit signal prevents speculative prefetching of instructions;
   in response to a request for a first memory line:
   fetch the first memory line of instructions;

speculatively prefetch a second memory line, in
response to detecting the inhibit signal is not
asserted;
inhibit prefetch of the second memory line, in
response to detecting the inhibit signal is asserted;
in response to detecting the first memory line includes
a branch instruction and identifying the branch
instruction as a small backward branch instruction:
in response to determining the small branch state
bit is set, set the prefetch inhibit signal, otherwise, set the small branch state bit;
in response to detecting the first memory line does not
include a small backward branch instruction:
clear the prefetch inhibit signal; and
clear the small branch state bit.

2. The system as recited in claim 1, wherein the instruction fetch unit is further configured to:
store fetched instructions corresponding to a plurality of threads of the computer program; and
maintain a small branch state value for each thread of the plurality of threads.

3. The system as recited in claim 1, wherein detecting the small backward branch instruction comprises:
partial decoding an opcode field of an instruction; and
decoding an address displacement field of an instruction.

4. The system as recited in claim 1, wherein the memory is an instruction cache.

5. The system as recited in claim 1, wherein the instruction fetch unit is further coupled to an instruction decoder within a processor core.

6. The system as recited in claim 1, wherein the speculatively prefetched instructions are in a second memory line, wherein the second memory line is consecutive in program order to the first memory line of instructions.

7. The system of claim 1, wherein in response to detecting the first memory line includes a small backward branch instruction and the small branch state bit is not set, the instruction fetch unit does not set the prefetch inhibit signal.

8. A method comprising:
storing a small branch state bit, wherein a value of the bit indicates whether an immediately prior fetched memory line included a small backward branch instruction, wherein a small backward branch instruction is a given branch instruction with a target that is in a same memory line as the given branch instruction and is younger in program order than the given branch instruction;
maintaining a prefetch inhibit signal, wherein when set the prefetch inhibit signal prevents speculative prefetching of instructions;
in response to a request for a first memory line:
fetching the first memory line of instructions;
speculatively prefetching a second memory line, in response to detecting the inhibit signal is not asserted;
inhibiting prefetching of the second memory line, in response to detecting the inhibit signal is asserted;
in response to detecting the first memory line includes a branch instruction and identifying the branch instruction as a small backward branch instruction;
in response to determining the small branch state bit is set, set the prefetch inhibit signal, otherwise, set the small branch state bit;
in response to detecting the first memory line does not include a small backward branch instruction:
clearing the prefetch inhibit signal; and
clearing the small branch state bit.

9. The method as recited in claim 8 further comprising:
storing fetched instructions corresponding to a plurality of threads of the computer program; and
maintaining a small branch state value for each thread of the plurality of threads.

10. The method as recited in claim 8, wherein in order to detect the small backward branch instruction the method comprises:
partially decoding an opcode field of an instruction; and
decoding an address displacement field of an instruction.

11. The method as recited in claim 8, wherein the memory is an instruction cache.

12. The method as recited in claim 8, wherein the instruction fetch unit is further coupled to an instruction decoder within a processor core.

13. The method as recited in claim 8, wherein the speculatively prefetched instructions are in a second memory line, wherein the second memory line is consecutive in program order to the first memory line of instructions.

14. The method of claim 8, wherein in response to detecting the first memory line includes a small backward branch instruction and the small branch state bit is not set, the method comprises not setting the prefetch inhibit signal.

15. An instruction fetch unit comprising:
an interface configured to communicate with a memory; and
circuitry configured to:
store a small branch state bit, wherein a value of the bit indicates whether an immediately prior fetched memory line included a small backward branch instruction, wherein a small backward branch instruction is a given branch instruction with a target that is in a same memory line as the given branch instruction and is younger in program order than the given branch instruction;
maintain a prefetch inhibit signal, wherein when set the prefetch inhibit signal prevents speculative prefetching of instructions;
in response to a request for a first memory line:
fetch the first memory line of instructions;
speculatively prefetch a second memory line, in response to detecting the inhibit signal is not asserted;
inhibit prefetch of the second memory line, in response to detecting the inhibit signal is asserted;
in response to detecting the first memory line includes a branch instruction and identifying the branch instruction as a small backward branch instruction:
in response to determining the small branch state bit is set, set the prefetch inhibit signal, otherwise, set the small branch state bit;
in response to detecting the first memory line does not include a small backward branch instruction:
clear the prefetch inhibit signal; and
clear the small branch state bit.

16. The instruction fetch unit as recited in claim 15, wherein the circuitry is further configured to:
store fetched instructions corresponding to a plurality of threads of the computer program; and
maintain a small branch state value for each thread of the plurality of threads.

17. The instruction fetch unit as recited in claim 15, wherein in response to detecting the first memory line includes a small backward branch instruction and the small branch state bit is not set, the circuitry does not set the prefetch inhibit signal.

* * * * *